(12) United States Patent
Shepherd et al.

(10) Patent No.: US 12,131,272 B1
(45) Date of Patent: Oct. 29, 2024

(54) SYSTEMS AND METHODS FOR AUTOMATED CONVERSATION MONITORING AND CONTROL

(71) Applicant: Tethr, Inc., Austin, TX (US)

(72) Inventors: Thomas Steven Shepherd, Phoneix, AZ (US); Robert Beasley, Austin, TX (US); Adam Larsen, Austin, TX (US); Ross Jones, Frisco, TX (US)

(73) Assignee: COLLABIP, Inc., Austin, TX (US)

( * ) Notice: Subject to any disclaimer, the term of this patent is extended or adjusted under 35 U.S.C. 154(b) by 0 days.

(21) Appl. No.: 18/539,715

(22) Filed: Dec. 14, 2023

(51) Int. Cl.
| | |
|---|---|
| G06Q 10/063 | (2023.01) |
| G06F 17/11 | (2006.01) |
| G10L 15/18 | (2013.01) |
| G10L 15/26 | (2006.01) |
| G10L 25/51 | (2013.01) |
| H04L 51/02 | (2022.01) |

(52) U.S. Cl.
CPC ........ *G06Q 10/063* (2013.01); *G10L 15/1822* (2013.01); *G06F 17/11* (2013.01); *G10L 15/26* (2013.01); *G10L 25/51* (2013.01); *H04L 51/02* (2013.01)

(58) Field of Classification Search
CPC .... G06Q 10/063; G06Q 30/01; G06Q 30/015; G10L 15/1822
See application file for complete search history.

(56) References Cited

U.S. PATENT DOCUMENTS

| | | |
|---|---|---|
| 8,204,884 B2 | 6/2012 | Freedman et al. |
| 9,215,996 B2 * | 12/2015 | Lee ........................ A61B 5/165 |
| 9,997,158 B2 | 6/2018 | Chen et al. |
| 10,015,316 B1 | 7/2018 | Horne et al. |
| 10,050,918 B2 | 8/2018 | Bastide et al. |
| 10,440,181 B1 | 10/2019 | Brown et al. |

(Continued)

OTHER PUBLICATIONS

Schmitt et al, Modeling and Predicting Quality in Spoken Human-Computer Interaction, Proceedings of the SIGDIAL 2011: the 12th Annual Meeting of the Special Interest Group on Discourse and Dialogue, pp. 173-184, Portland, Oregon, Jun. 17-18, 2011 (Year: 2011).*

(Continued)

*Primary Examiner* — Andre D Boyce
(74) *Attorney, Agent, or Firm* — Ansari Katiraei LLP; Arman Katiraei; Sadiq Ansari

(57) ABSTRACT

A conversation control system and associated methods adapt or modify currently active or future conversations and/or interactions based on machine-generated models that continuously evaluate client satisfaction over the entirety of the active conversations and/or interactions. The system receives a conversation with utterances by two or more participants, and generates a vector with features comprised of words, word sequences, and category classifications associated with at least one of the utterances. The system provides the features as inputs to a prediction model that assigns weights to a set of features based on a modeling of different impacts that each feature of the set of features has on one or more aspects of customer satisfaction. The system generates predictions for those aspects of customer satisfaction without input from the participants based on the assigned weights, and performs an automated action based on the one or more predictions.

20 Claims, 10 Drawing Sheets

(56) References Cited

U.S. PATENT DOCUMENTS

| | | |
|---|---|---|
| 10,455,378 B2 | 10/2019 | Rakovitsky et al. |
| 10,522,151 B2 | 12/2019 | Cartwright et al. |
| 10,778,616 B2 | 9/2020 | Bastide et al. |
| 10,798,027 B2 | 10/2020 | Agarwal et al. |
| 10,878,479 B2 | 12/2020 | Wu et al. |
| 10,887,263 B2 | 1/2021 | Bastide et al. |
| 10,891,947 B1 | 1/2021 | Le Chevalier |
| 10,896,428 B1* | 1/2021 | Balasubramaniam ........... G10L 15/1815 |
| 11,355,120 B1* | 6/2022 | Talib ............. G10L 15/22 |
| 11,356,558 B2 | 6/2022 | Brown et al. |
| 11,862,157 B2* | 1/2024 | Aggarwal ............. G06Q 50/12 |
| 2003/0074201 A1 | 4/2003 | Grashey et al. |
| 2003/0232159 A1 | 12/2003 | Pagilagan |
| 2013/0325992 A1 | 12/2013 | McGann et al. |
| 2014/0220526 A1 | 8/2014 | Sylves |
| 2015/0178371 A1* | 6/2015 | Seth ............. G06F 40/117 707/755 |
| 2015/0256675 A1* | 9/2015 | Sri ............. H04M 3/5183 379/265.09 |
| 2017/0134577 A1 | 5/2017 | Wold |
| 2017/0169816 A1 | 6/2017 | Blandin et al. |
| 2017/0345416 A1 | 11/2017 | Bangalore |
| 2018/0077286 A1* | 3/2018 | Raanani ............. G10L 17/02 |
| 2018/0096271 A1* | 4/2018 | Raanani ............. G06N 20/00 |
| 2018/0122383 A1* | 5/2018 | Raanani ............. H04M 3/5175 |
| 2018/0181561 A1* | 6/2018 | Raanani ............. G10L 15/1822 |
| 2018/0183929 A1 | 6/2018 | Fang et al. |
| 2018/0183930 A1* | 6/2018 | Raanani ............. G06F 15/76 |
| 2018/0218733 A1* | 8/2018 | Raanani ............. G10L 15/22 |
| 2018/0309707 A1 | 10/2018 | Bastide et al. |
| 2018/0367480 A1* | 12/2018 | Housman ............. G06F 40/247 |
| 2019/0057698 A1* | 2/2019 | Raanani ............. H04M 3/22 |
| 2019/0355043 A1 | 11/2019 | Swierk et al. |
| 2020/0184278 A1* | 6/2020 | Zadeh ............. G06F 3/044 |
| 2020/0218766 A1 | 7/2020 | Yaseen et al. |
| 2021/0050002 A1 | 2/2021 | Bastide et al. |
| 2021/0089860 A1 | 3/2021 | Heere et al. |
| 2021/0150398 A1 | 5/2021 | Bastide et al. |
| 2021/0157990 A1 | 5/2021 | Lima et al. |
| 2021/0321000 A1* | 10/2021 | Gopalan ............. G06F 40/30 |
| 2022/0068263 A1* | 3/2022 | Roy ............. G06F 40/30 |
| 2022/0131975 A1* | 4/2022 | Krishnan ............. G06N 20/20 |
| 2022/0156582 A1* | 5/2022 | Sengupta ............. G06N 3/042 |
| 2022/0270600 A1* | 8/2022 | Aggarwal ............. G10L 15/16 |
| 2024/0127804 A1* | 4/2024 | Shirodkar ............. G10L 15/1807 |

OTHER PUBLICATIONS

Alam et al, Annotating and modeling empathy in spoken conversations, Computer Speech & Language 50 (2018): 40-61. (Year: 2018).*

* cited by examiner

SYSTEMS AND METHODS FOR AUTOMATED CONVERSATION MONITORING AND CONTROL

BACKGROUND

Support, sales, and other teams may contact and/or interact with hundreds or thousands of clients on a daily basis. It is near impossible to accurately determine the effectiveness of the teams and individual agents without monitoring the conversations and interactions between the agents and the contacted clients.

The teams may solicit client feedback through surveys that are sent to the clients at the conclusion of a call or interaction. However, survey response rates are exceptionally low with fewer than 5% of the surveys being completed. Moreover, the few surveys that are completed typically provide a biased or incomplete snapshot of the team or agent performance. For instance, clients typically complete surveys when they have had an overly negative experience and want to express their dissatisfaction around an agent, product, or experience. Satisfied clients often do not complete the surveys.

DETAILED DESCRIPTION OF PREFERRED EMBODIMENTS

Figure 1:
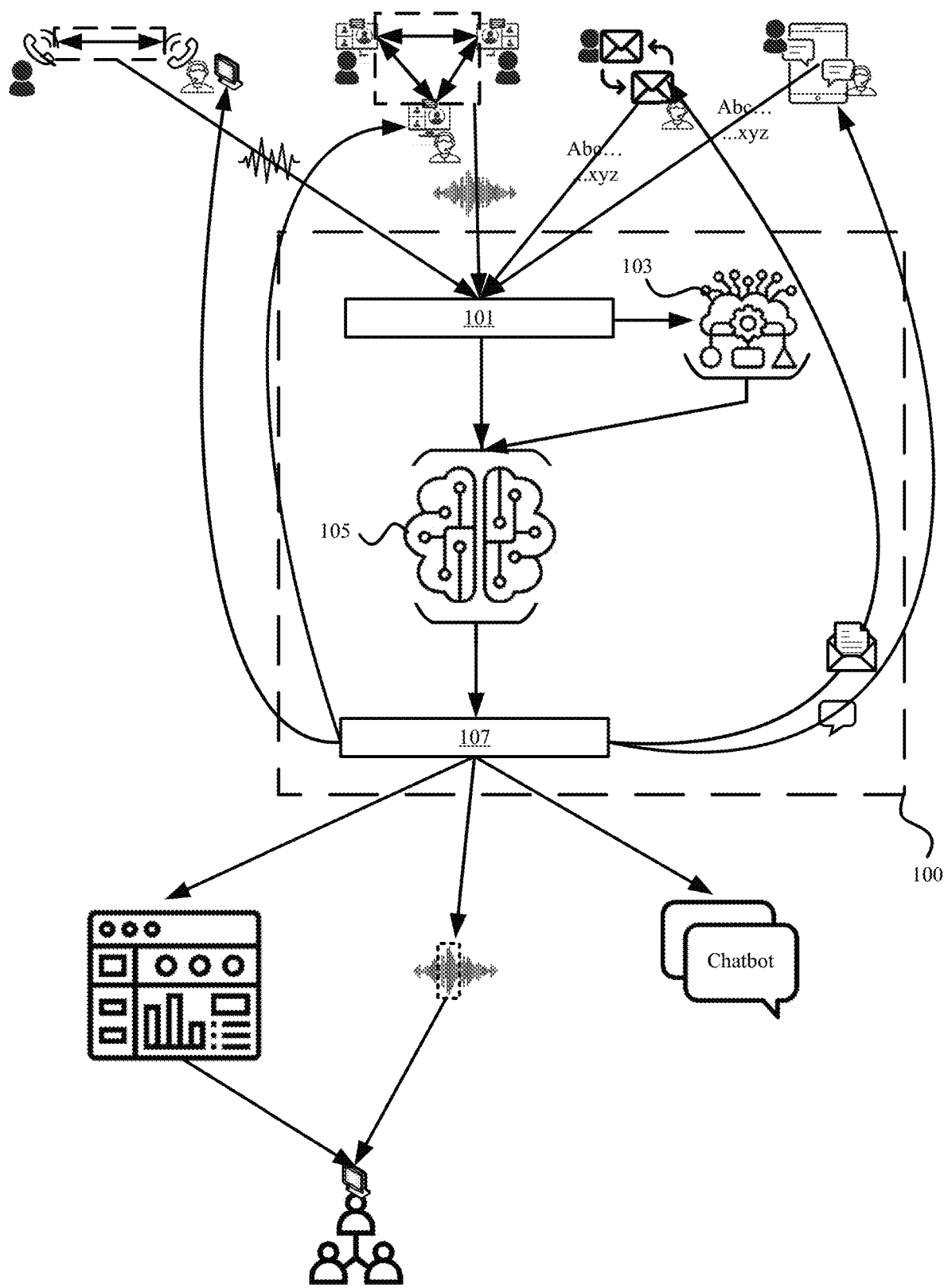
FIG. 1 illustrates an example architecture for a conversation control system in accordance with some embodiments presented herein.

The following detailed description refers to the accompanying drawings. The same reference numbers in different drawings may identify the same or similar elements.

Provided are systems and associated methods for automated conversation monitoring and control. The automated conversation monitoring and control provide oversight and real-time analytics for support, sales, and/or other teams within an organization, and provide automated controls or actions for adapting or modifying the conversations and/or interactions of the individual agents in those teams based on machine-generated models that continuously evaluate client satisfaction over the entirety of the conversations and/or interactions.

A conversation control system performs the automated conversation monitoring and control by receiving audio streams, textual exchanges (e.g., emails, textual chats, instant messages, etc.), and/or other forms of communication from the different calls, conversations, conferences, and/or other interactions that take place with at least one agent of the organization. The conversation control system analyzes and transcribes the dialog, quantifies conversation characteristics based on the analysis, and classifies different segments of each conversation. The conversation control system generates vectors with features comprised of different word, word sequence, conversation metrics, and/or classification combinations. The conversation control system may solve the vectors as multi-linear polynomial equations based on weights assigned to each feature of a vector. The weights are determined from a machine-generated modeling of client satisfaction over different completed conversations that are associated with client-generated surveys. Solving the vectors includes generating predictions for client satisfaction throughout each conversation and/or how client satisfaction changes over the course of the conversation based different interactions or sequences of interactions between the at least one agent and one or more clients. The conversation control system dynamically executes different automated actions and/or conversation controls based on the generated predictions.

In some embodiments, the automated actions include the conversation control system dynamically generating and presenting a prompt, response, or script to an agent in an ongoing conversation. The conversation control system may dynamically generate the prompt, response, or script based on a modeling of the prior exchanged words, classifications, and conversation metrics of the conversation and a prediction that the generated prompt, response, or script may adjust the course of the conversation to improve client satisfaction.

In some embodiments, the automated actions include the conversation control system filtering conversations based on the generated predictions, and presenting sampled excerpts from the filtered conversations for training, evaluation, and/or monitoring purposes. For instance, the conversation control system predicts dissatisfaction of a client in a particular conversation, filters the conversation to extract segments that contributed to the dissatisfaction, and presents the extracted segments to a supervisor or manager so that the supervisor or manager does not have to manually listen to the entirety of that conversation or other conversations to identify interactions that led to a dissatisfied client.

In some embodiments, the automated actions include the conversation control system performing automated tasks in response to the generated predictions. For instance, the conversation control system may detect a particular conversation between a first agent and a client with a generated prediction that is below a specified threshold, may schedule a follow-up conversation between a different second agent and the client, may generate content (e.g., coupon code, informational materials in response to identified topics or questions, etc.) to send to the client, and/or evaluate the first agent performance across different metrics.

In some embodiments, the automated actions include the conversation control system generating user interfaces that highlight trends, topics, issues, and/or other data that reoccur with regularity in the monitored conversations and that contribute to positive or negative satisfaction. Moreover, the conversation control system may artificially generate agent interactions to replace actual agent interactions that are provided in response to different client inquiries or requests, may model the artificially generated agent interactions, and may determine the effectiveness of the actual and/or artificially generated agent interactions based on predictions generated for the actual agent interactions and each of the artificially generated agent interactions. The conversation control system may also determine the optimal artificially generated agent interaction to a specific client inquiry or request, and may present that optimal artificially generated agent interaction in an active conversation in response to detecting the specific client inquiry or request in the active conversation. In other words, the conversation control system may be a generative system with automated chatbots that directly interact with clients over different communication mediums.

FIG. 1 illustrates an example architecture for a conversation control system 100 in accordance with some embodiments presented herein. Conversation control system 100 may be integrated or incorporated as part of a communications platform that different agents or teams of an organization use to contact clients or other individuals inside or outside of the organization. Conversation control system 100 may be integrated or incorporated as part of the communications platform in order to provide the automated conversation monitoring and control for the organization or its different teams.

Conversation control system 100 includes conversation monitor 101, one or more classifiers 103, neural network 105, and conversation controller 107. Each of conversation monitor 101, one or more classifiers 103, neural network 105, and conversation controller 107 may be implemented on one or more machines or devices with processor, memory, storage, network, and/or other hardware resources that are specifically adapted for the automated conversation monitoring and control. Conversation control system 100 may be cloud-based and remote from the communications platform or may be configured and executed locally on the devices or machines of the communications platform.

In some embodiments, conversation control system 100 may include more or fewer components for performance of the automated conversation monitoring and control. For instance, conversation controller 107 may include two or more plugin or configurable components for performing different automated actions or controls.

Conversation monitor 101 receives audio streams from active calls, conferences, or other verbal conversations or interactions between two or more individuals that include at least one agent of an organization participating in the conversation or interaction. In some embodiments, conversation monitor 101 runs on call or conference devices used by the agents to initiate or receive calls or conferences, and obtains access to the audio streams routing through the call or conference devices. In some other embodiments, the communications platform used by the organization forwards or provides conversation monitor 101 access to the audio streams. For instance, conversation monitor 101 may be a passive listening device on calls or conferences involving the agents. Alternatively, conversation monitor 101 may receive data packets associated with the communication protocols (e.g., Session Initiation Protocol, Voice over Internet Protocol, Real Time Messaging Protocol, Web Real-Time Communications, etc.) used for the communication sessions.

Conversation monitor 101 may also receive communications in other formats. For instance, conversation monitor 101 may have access to emails, chats, and/or other textual exchanges of the communications platform, and may receive the textual exchanges between an agent and another individual inside or outside the organization.

Conversation monitor 101 may aggregate different forms of communication that are exchanged during the same conversation, conference, or that relate to the same communication session. Similarly, conversation monitor 101 may aggregate different forms of communication between the same individuals that occur at different times and/or over different communication media. For instance, conversation monitor 101 may aggregate the audio stream of a particular conference, textual messages exchanged between the particular conference participants while the particular conference is ongoing or active, and email messages exchanged between the particular conference participants after the particular conference has concluded.

Conversation monitor 101 may process the aggregated communications to separate the utterances of different individuals in the aggregated communications, transcribe the audio or spoken dialog into text, and/or generate conversation metrics from analyzing the aggregated communications. An utterance may correspond to one or more sentences, a continuous communication made by one individual before pausing or another individual begins communicating (e.g., interrupting, speaking, or typing). A conversation metric may correspond to a measurement or value that is determined from analysis of a segmented utterance or analysis of a conversation as a whole (e.g., talk time by a first user, talk time by a second user, amount of silence, speaking rate, number of interruptions, etc.).

One or more classifiers 103 analyze the segmented utterances and provide classifications or labels to the segmented utterances. In some embodiments, classifiers 103 classify a segmented utterance based on a topic, subject matter, product, or service that is detected in that segmented utterance. In some embodiments, classifiers 103 classify a segmented utterance based on sentiment expressed in that segmented utterance. For instance, classifiers 103 may associate words and/or voice characteristics (e.g., high pitch, fast speaking, etc.) with different sentiments (e.g., frustration, boredom, interest, excitement, etc.). In some embodiments, classifiers 103 classify a segmented utterance based on the utterance structure or format (e.g., question, response, command, instruction, request, etc.).

Classifiers 103 may derive additional conversation metrics based on the assigned classifications or labels. For instance, a conversation metric for the total number of questions asked may be defined based on classification labels indicating when an utterance corresponds to a question.

Classifiers 103 are customizable such that different organizations may configure or generate classifiers 103 that associate customized classifications or labels to the segmented utterances based on custom defined criteria. For instance, a first classifier 103 may be configured to provide a first classification of "expressed interest" to a particular utterance of "let me think about it", and a second classifier 103 may be configured to provide a different second classification of "no interest" to that same particular utterance.

Classifiers 103 may classify the utterances according to words and word sequences in the utterances and/or the conversation metrics that are generated for those utterances by conversation monitor 101.

Each utterance and the associated data (e.g., classification labels, conversation metrics, etc.) may be converted to a vector. Each vector includes features that are defined based on the words, word sequences, conversation metrics, and/or classifications of one or more utterances. Neural network 105 receives the vectors as inputs, and generates a prediction by solving the vectors as multi-linear polynomial equations. For instance, neural network 105 assigns different weights to the features based on a probability by which each feature matches to a modeled feature and a determined contribution of that modeled feature to the prediction. The prediction may correspond to a binary result of satisfied or dissatisfied or a numeric score that ranges between different degrees of satisfaction and dissatisfaction. The prediction may also be quantified using other values, value ranges, or measurements.

Conversation controller 107 receives the predictions that are generated for each conversation, and performs various automated actions based on the generated predictions. In some embodiments, the automated actions may include controlling an active conversation that is associated with a prediction of a dissatisfied client. Controlling the active conversation may include dynamically generating and presenting prompts, scripts, or content to the agent engaged with the dissatisfied client or directly to the dissatisfied client. Specifically, conversation controller 107 accounts for the past utterances in that active conversation and dynamically generates new utterances that are determined from the modeling to improve the client satisfaction. The automated actions may include filtering an active or completed conversation based on the satisfaction prediction to extract and present filtered segments of the conversation with the greatest impact on the satisfaction prediction for human review. In this manner, conversation control system 100 monitors all conversations, and presents segments from an automatically selected subset of conversations that are predicted to require human review or intervention. The automated actions may include generating user interfaces based on predictions produced for a set of conversations. The user interfaces may be dynamically populated based on common features of conversations with related predictions. Specifically, the user interfaces may present trends, topics, issues, and/or other data that frequently reoccur in the monitored conversations and that contribute to positive or negative satisfaction and/or comparative analytics or benchmarking of different agent performance, products, services, and the like.

Figure 2:
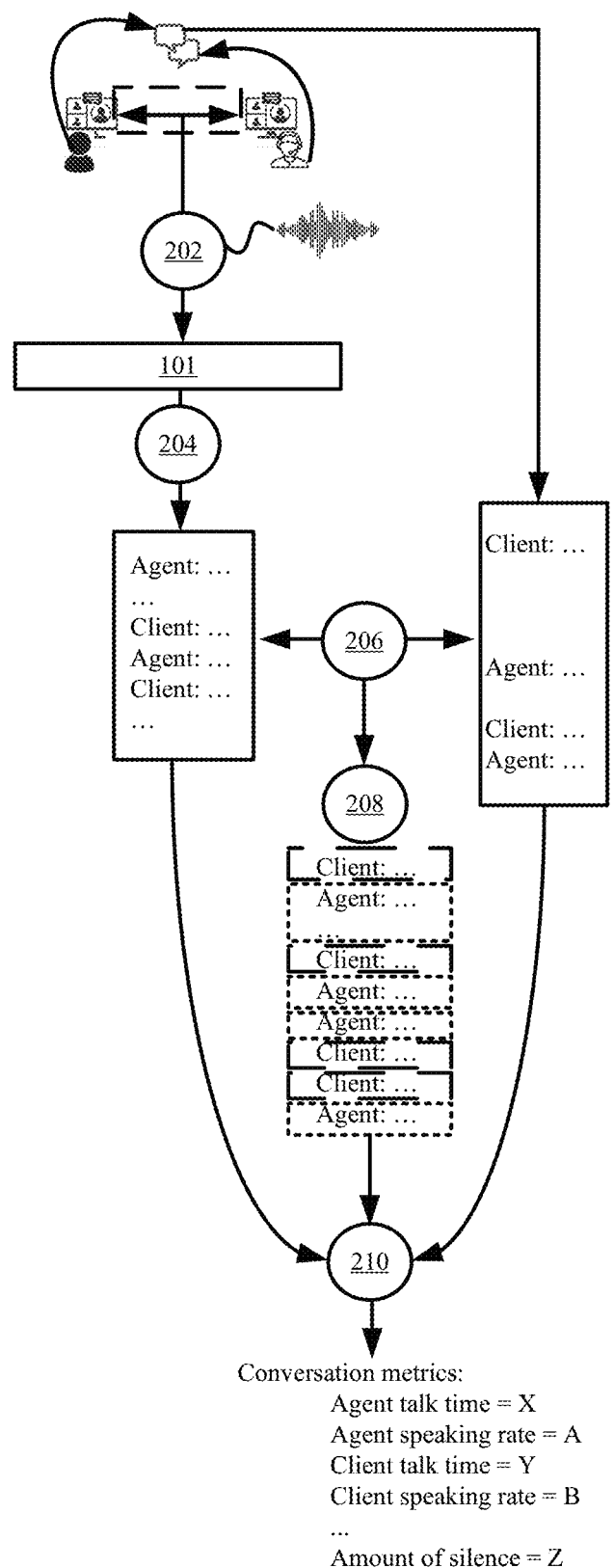
FIG. 2 illustrates an example of the conversation processing performed by the conversation monitor in accordance with some embodiments presented herein.

FIG. 2 illustrates an example of the conversation processing performed by conversation monitor 101 in accordance with some embodiments presented herein. Conversation monitor 101 detects a conversation involving a particular agent and a client that is conducted across different communication channels including verbal communications (e.g., a telephone call or audio and/or video conference) and/or textual messages that are exchanged via email, chat services, instant messaging, or other applications.

Conversation monitor 101 may detect that the different communication channels are part of the same conversation based on common identifiers or related identifiers associated with the different communication channels or timing that is associated with the communication channels and the common or related identifiers. For instance, the client and the particular agent may join a conference and exchange messages on an instant messaging application using the same email addresses or account login information. Alternatively, the client telephone number may be linked to a client profile that also stores other identifiers for identifying the same client over email, chat services, instant messaging, or other applications.

Conversation monitor 101 receives (at 202) an audio stream or audio feed from one or more communication channels. Conversation monitor 101 may use adaptive signal processing algorithms to detect audio associated with different speakers, and to associate the detected audio to the correct speaker. In the case of monaural interactions, conversation monitor 101 may use automatic diarization to identify different participants in a conversation, based on audio properties, and separate the audio of each participant into distinct channels.

Conversation monitor 101 transcribes (at 204) the audio from the differentiated audio streams. Conversation monitor 101 may use automatic speech recognition techniques to transcribe the audio of each speaker. In transcribing (at 204) the audio, conversation monitor 101 generates text for the spoken dialog and separates the generated text based on the speaker identification. Accordingly, text generated from the audio spoken by the client is attributed to the client via a first identifier or by entering the text in a first transcript for the client, and text generated from the audio spoken by the particular agent is attributed to the particular agent via a second identifier or by entering the text in a second transcript for the particular agent.

Conversation monitor 101 may combine (at 206) the text from the transcripts with text that conversation monitor 101 receives from other communication channels that are detected to be part of the same conversation. For instance, text from a separate chat session exchanged while the client and particular agent are speaking may be combined or intermixed with the transcript.

Conversation monitor 101 segments (at 208) the transcripts and/or combined textual communications into separate utterances. Each segmented (at 208) utterance may be stored in a separate data structure and/or tagged with an identifier. The identifier may be unique to each utterance or may be an identifier for the individual that spoke, wrote, or otherwise generated the text within the utterance. The identifier may further identify the conversation to which the utterance belongs and/or a timestamp for when the utterance occurred in the conversation.

Each utterance may correspond to uninterrupted dialog or communication from one individual. Accordingly, an utterance starts when one individual begins speaking and ends when that individual stops speaking for a duration of time or when another individual begins speaking.

Conversation monitor 101 analyzes the communications exchanged in the different aggregated communication channels, and derives (at 210) conversation metrics based on the analysis. The conversation metrics may include measurements for the amount of time a particular individual speaks during a conversation, a measured amount of silence, a number of questions, a number of interruptions, an amount of silence, a number of times that a speaker's voice is elevated (e.g., shouting), a count for certain expressions or behaviors, and/or other measurements that may be generated based on the back and forth between two or more individuals. Conversation monitor 101 may attribute the conversation metrics to individual utterances and/or to the entire conversation.

Figure 3:
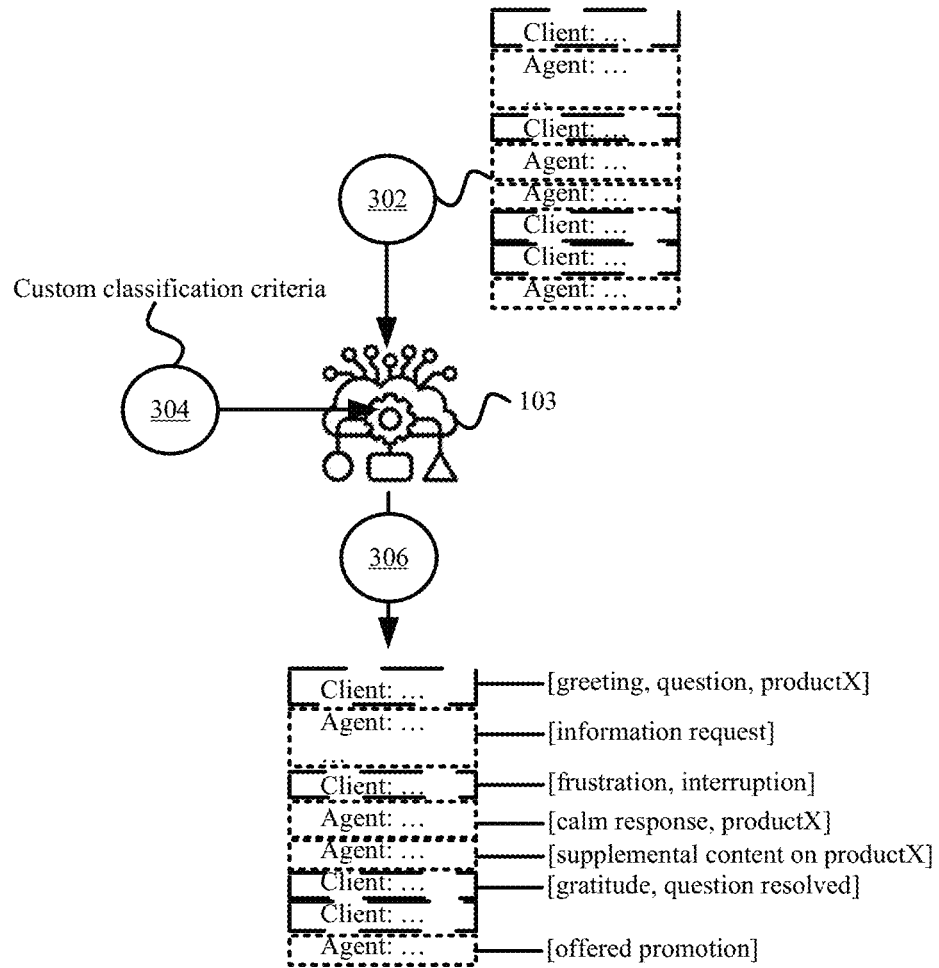
FIG. 3 illustrates an example of assigning classifications to different utterances in accordance with some embodiments presented herein.

Conversation monitor 101 may pass the utterances to one or more classifiers 103 for classification. FIG. 3 illustrates an example of assigning classifications to different utterances in accordance with some embodiments presented herein.

Classifiers 103 receive (at 302) the segmented utterances of a particular conversation. Classifiers may receive (at 302) the segmented utterances of a conversation as they are generated by conversation monitor 101 and/or while the conversation is ongoing. For instance, once a first speaker finishes speaking and/or a second speaker begins speaking, conversation monitor 101 may segment the first speaker's speech into an utterance, transcribe the utterance, and pass the transcription to classifiers 103.

Classifiers 103 are configured (at 304) with classification criteria for classifying each received (at 302) utterance. The classification criteria may be defined or customized for a particular organization. For instance, a first organization may customize the classification criteria to identify utterances of specific topics, and classifiers 103 may be configured with the classification criteria to identify mentions of the specific topics in conversations conducted by agents of the first organization. A second organization may customize the classification criteria to identify various behaviors, and classifiers 103 may be configured with the classification criteria to detect the various behaviors in the received (at 302) utterances.

In some embodiments, the classification criteria may be customized according to the agent role (e.g., support, sales, etc.), offered products or services, and/or custom insights desired by different organizations or users of conversation control system 100. For instance, classification criteria associated with conversations involving sales agents may be defined with criteria for determining the mention of competitor products, pricing, promotions, competitive advantages, and adherence to a sales script, and classification criteria associated with conversations involving support agents may be defined with criteria for determining friendliness, politeness, and response detail.

Classifiers 103 classify (at 306) the received (at 302) utterances according to the configured (at 304) classification criteria. Classifying (at 306) the received (at 302) utterances includes adding a classification identifier or label to an utterance. The classification identifier or label identifies the classification criteria satisfied by that utterance. For instance, a first classifier 103 may tag an utterance with a first label for a topic or subject matter that is detected from product or service names and surrounding context in that utterance that match first criteria configured (at 304) for that first classifier 103, and a second classifier 103 may tag the same utterance with a second label for sentiment or behavior (e.g., bored, interested, angry, happy, laughing, frustrated, etc.) that is detected from words or sequences of words in that utterance that match second criteria configured (at 304) for that second classifier 103. Classifiers 103 may also reference the original audio when classifying (at 306) the received (at 302) utterances. The original audio may contain additional information (e.g., speaker tone, pitch, etc.) for improving the utterance classification.

Conversation control system 100 may generate vectors based on the utterance text, conversation metrics, and classification labels that are output from conversation monitor 101 and classifiers 103. In some embodiments, an individual utterance and the conversation metrics and the classification labels associated with that individual utterance are used to generate a vector. In some other embodiments, the vector is defined from multiple utterances of a conversation, the conversation metrics derived for that conversation, and the classification labels that are generated for the individual utterances.

Figure 4:
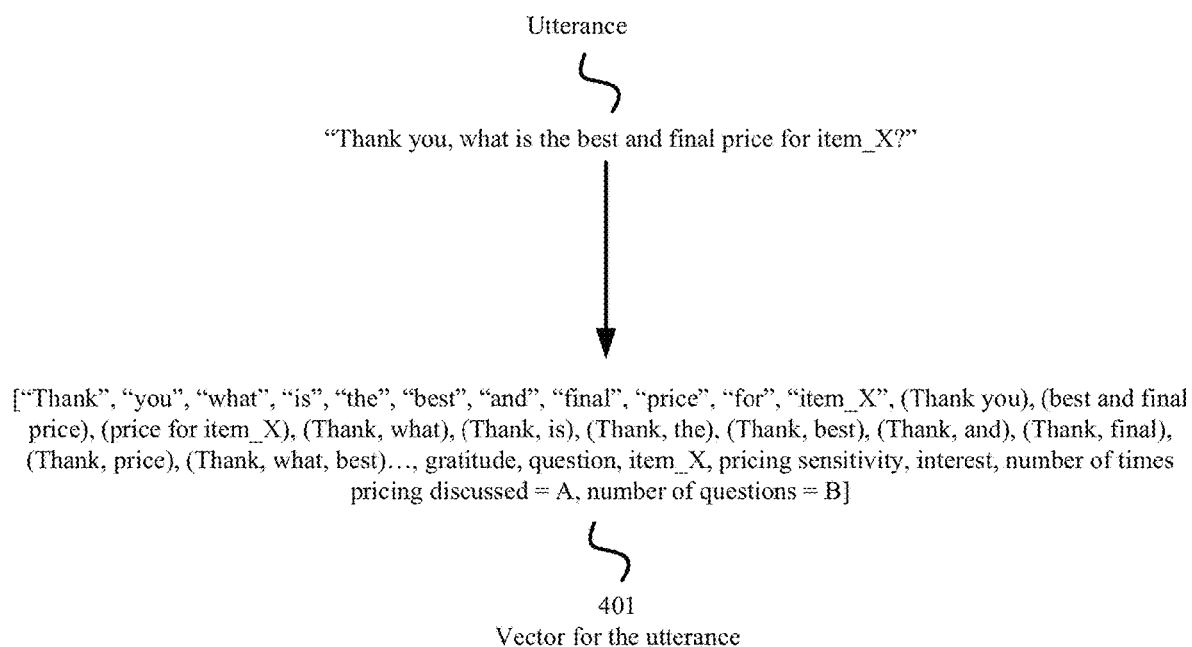
FIG. 4 illustrates an example vector that is generated for an utterance in accordance with some embodiments presented herein.

FIG. 4 illustrates example vector 401 that is generated for an utterance in accordance with some embodiments presented herein. The utterance corresponds to text that is transcribed from an audio stream or that is extracted from a textual communication exchange. The text may include one or more sentences or words associated with a continuous or uninterrupted communication made by one individual during a conversation. The utterance may be associated with conversation metrics for measured properties of the utterance, and/or with labels for various classifications that were satisfied or detected in the utterance by classifiers 103.

Vector 401 includes features that are defined based on words, categories (e.g., classification labels), conversation metrics, and sequences of words, categories, and conversation metrics. In some embodiments, vector 401 represents a partial or complete Lie group transform invariant set in one dimension. The Lie group transformations may be continuously differentiable functions that are applied reversibly to other functions. Examples of Lie group transformations include translation (e.g., moving along one or more dimensions), rotation (e.g., sinusoidal movement around a predefined axis), and dilation (e.g., changing size).

The partial Lie group invariant vectorization of the words and word sequences from an utterance creates a set of unique values that uniquely represent the sequence regardless of where individual words occur within a larger sequence. Vector 401 is defined with a unique feature for each pair of words that occur in sequence within the phrase, independent of where they occurred within the phrase. The vector features will occur in the same form in any sequence where the words in the phrase occur in the same order no matter how they are embedded within the larger phrase.

Changing the presence of a word or the order of two words in the target sequence may only partially degrade the vector representation, allowing for the detection of partial sequences. By limiting the sequence pairs to words occurring within a specified distance of each other, it is possible to account for the effects of intervening words. It is also possible to expand the feature order (e.g., the number of sequential words in each vector element), and thereby expand the scope of the vector 401. A vector of sufficient scope may uniquely represent any sequence of words or variables and may be directly compared with the corresponding vector of any other sequence. For computational efficiency, features of vector 401 may be replaced with unique integer values.

Conversation control system 100 uses labeled conversations and vectors generated from utterances of the labeled conversations to train neural network 105. A labeled conversation corresponds to a conversation with a completed user survey. The user survey asks a user that engaged in the conversation about specific experiences or conversation aspects (e.g., agent responsiveness, agent knowledge, agent etiquette, etc.) that are of importance to the organization and that the organization uses to gauge client satisfaction. The completed user survey includes scores, rankings, ratings, or values that the user assigns to those specific experiences and/or conversation aspects. For instance, a first organization may determine client satisfaction according to whether a client felt that their concerns were addressed in a timely fashion and with a certain degree of courtesy from an agent, and a second organization may determine client satisfaction according to whether a client received sufficient information about a product relative to competitor products and was given an adequate demonstration of that product.

Training neural network 105 involves modeling the vectors of the labeled conversations according to the associated survey scores or values to determine the features that accurately predict those survey scores or values. The resulting model that is output by neural network 105 after the training is complete provides a weighting to each feature from the vectors of the labeled conversations based on the relevance or importance of the feature in predicting or producing the scores or values from the surveys of the labeled conversations.

Figure 5:
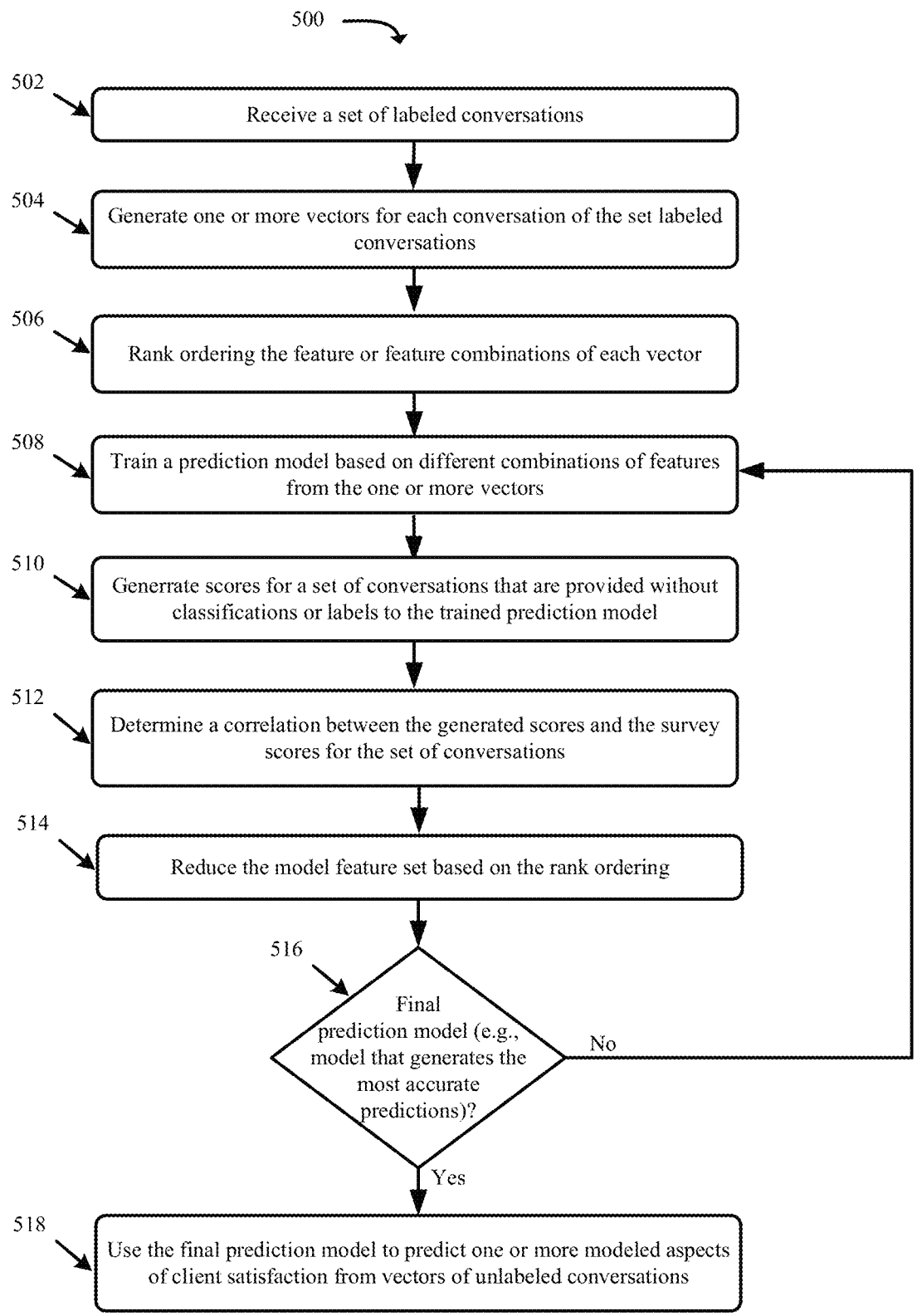
FIG. 5 presents a process for generating a customized model for predicting client satisfaction from labeled conversations in accordance with some embodiments presented herein.

FIG. 5 presents a process 500 for generating a customized model for predicting client satisfaction from labeled conversations in accordance with some embodiments presented herein. Process 500 describes the operations for training neural network 105 to produce the customized model for predicting client satisfaction.

Process 500 includes receiving (at 502) a set of labeled conversations to use as training data. Receiving (at 502) the set of labeled conversations may include receiving the audio and/or text that was exchanged over one or more communication channels during the course of a conversation and one or more surveys that clients of the conversation completed to indicate their satisfaction as to various aspects of the conversation or the conversation as a whole. For instance, the completed surveys include untargeted questions that simply ask the clients to rate their experience or level of satisfaction. The completed surveys may also include targeted questions that ask the clients to rate their experience with respect to certain aspects of the conversation (e.g., friendliness of the agent, agent knowledge, were the client concerns resolved to their satisfaction, etc.).

Process 500 includes generating (at 504) one or more vectors for each conversation of the set labeled conversations. For instance, a vector may be generated from the words of an entire conversation, the words of each conversation participant, each segmented utterance, and/or other parsing of the conversation. Accordingly, generating (at 504) the one or more vectors includes isolating the dialog and text from different participants, transcribing the audio, attributing the converted text to the participant that spoke the words, generating conversation metrics for the parts or all of the conversation, isolating individual utterances, classifying each utterance with labels for zero or more identified categories, and/or associating the survey results for the conversation that produced the one or more vectors to those one or more vectors. Generating (at 504) the one or more vectors further includes defining the vector features based on different combinations of the words, word sequences, categories, conversation metrics, and/or other data derived or associated with the conversation.

Process 500 includes rank ordering (at 506) the features or feature combinations of each vector based on the frequency of occurrence and/or occurrence ratio. The rank ordering (at 506) is based on the concept of "coverage". The more a feature or feature combination is represented in the vectors of the inputted training data, the less that feature or feature combination will be affected by sampling error and/or noise when solving the model. A larger sample of any given feature or feature combination (e.g., the same feature or feature combination being present in a larger number or greater percentage of the vectors) will tend to average out any error in its measured relationship to the modeled prediction.

Process 500 includes training (at 508) a prediction model based on different combinations of features from the one or more vectors. Training (at 508) the prediction model may include selecting and inputting the different combinations of features from the one or more vectors and the completed satisfaction surveys for the labeled conversations from which the different combinations of features are generated into a deep learning artificial neural network (ANN) or another neural network (e.g., neural network 105).

The ANN determines a correlation between each feature or feature combination and a survey score or value. The ANN performs pattern recognition to determine if a feature or feature combination is found in one or more conversations with a particular survey score, a similar set of survey scores, or opposing survey scores. For instance, the ANN may determine that a first vector feature with the word sequence "I" and "good" and with the label "greeting response" is found in 55% of conversations associated with satisfied clients or a particular survey prompt with a positive score and in 40% of conversations associated with dissatisfied clients or the particular survey prompt with a negative score. Accordingly, the ANN determines that there is no correlation or a very weak correlation between the first vector feature contributing to a satisfied client or the particular survey prompt. The ANN may determine that a second vector feature with the word sequence "I" and "terrible" and with the label "greeting response" is found in 10% of conversations associated with satisfied clients or the particular survey prompt with a positive score and in 90% of conversations associated with dissatisfied clients or the particular survey prompt with a negative score. Accordingly, the ANN determines that there is a strong correlation between the second vector feature contributing to a dissatisfied client or the negative score for the particular survey prompt.

The ANN may define weights to assign to the features or feature combinations based on the determined correlation. The weights quantify a contribution that each feature or feature combination has on the satisfaction prediction produced by the prediction model, wherein the satisfaction prediction may be a singular value for representing client satisfaction or multiple values for representing different aspects of client satisfaction that were identified in the completed surveys used to train (at 508) the prediction model. The weights may have a positive or negative impact to the satisfaction prediction or survey score with the degree of impact being adjusted by the weighting (e.g., 0-100%).

In some embodiments, multiple different weights may be assigned to the same feature or feature combination when those same features or feature combination are used to generate different scores for different aspects of client satisfaction. For instance, a first weight may be assigned to a particular feature combination when, during the modeling, it is determined that the particular feature combination has a first impact or score contribution to client satisfaction as relating to product pricing, and a second weight may be assigned to the particular feature combination when, during the modeling, it is determined that the particular feature combination has a second impact or score contribution to client satisfaction as relating to agent etiquette.

Accordingly, training (at 508) the prediction model may include defining the neurons or synapses of the prediction model based on the combinations of features that are determined to have a strong correlation to a survey score or value and the weights assigned to those combinations of features. The resulting prediction model may produce one or more real-valued outputs, depending on what is required. For example, a single value may be produced representing the probability of a customer indicating "satisfied" on a customer satisfaction survey or predicting a score from 1 to 5 using a Likert scale. Alternatively, probabilities may be independently produced for each specific score in the desired range.

Process 500 includes generating (at 510) scores for a set of conversations that are provided without classifications or labels to the trained prediction model. Conversation control system 100 receives the audio streams and/or other communication channels of the set of conversations, and performs the utterance segmentation, transcription, and classification. Conversation control system 100 also derives the conversation metrics associated with the set of conversations, generates one or more vectors based on the words and word sequences of the resulting utterances, category classifications, and conversation metrics, and inputs the one or more vectors into the prediction model. The prediction model may be applied to an entire interaction or conversation, taking into account the full transcript and all data associated with the interaction or conversation, or may be applied to individual utterances based on the partial transcript and data leading up to that utterance. This allows the prediction model to take the context of each utterance into account when determining the utterance score.

In generating (at 510) the scores, the prediction model identifies features or feature combinations from an input vector that are defined in the prediction model, and associates the weights from the features or feature combinations defined in the prediction model to the matching features of the input vector. More specifically, the prediction model may assign different weights to the same features or feature combinations of the input vector depending on the prediction being generated and/or for generating survey scores for different modeled aspects of client satisfaction. Conversation control system 100 solves the weighted vector to generate the prediction of client satisfaction as a single value representing overall satisfaction or multiple scores representing satisfaction with respect to different aspects of the interaction or experience.

In some embodiments, the set of conversations correspond to a subset of labeled conversations that are excluded from the training (at 508) of the prediction model, and are used to test the accuracy of the prediction model and/or refine the prediction model. Accordingly, process 500 includes determining (at 512) a correlation between the generated (at 510) scores and the survey scores for the set of conversations. Determining (at 512) the correlation may include determining how close the generated (at 510) scores are to the actual survey scores. For instance, conversation control system 100 may evaluate the results based on the Pearson correlation coefficient or the coefficient of determination R^2, (R squared), that measure the "goodness of fit" against the test data. Other reasonable measures of model accuracy may also be used in this context.

Process 500 includes reducing (at 514) the model feature set based on the rank ordering (at 506). Reducing (at 514) the model feature set includes removing a subset of features or feature combinations from the generated prediction model that are determined to be unreliable predictors or measures of satisfaction as determined from the rank ordering (at 506). Specifically, reducing (at 514) the model feature set includes removing the features or feature combinations of the model that were found or that occurred with the least frequency in the training data.

For instance, neural network 105 or the ANN may determine that a third vector feature and a fourth vector feature have the same 90% correlation to dissatisfied clients (e.g., a negative score for a particular survey prompt) and the same 10% correlation to satisfied clients. Neural network 105 or the ANN may also determine that the third vector feature occurs with a 20% frequency in all the labeled conversations or vectors used to train (at 508) the model (e.g., 20 out of 100 labeled conversations), whereas the fourth vector feature occurs with a 50% frequency in all the labeled conversations or vectors used to train (at 508) the model (e.g., 50 out of 100 labeled conversations). Accordingly, neural network 105 or the ANN may determine that the fourth vector feature is a more accurate or reliable indicator of a dissatisfied customer (e.g., the negative score for the particular survey prompt) than the third vector feature because of the greater frequency or regularity with which the fourth vector feature is associated with the same client satisfaction result. Continuing with the example, reducing the model feature set may include removing the third vector feature from the prediction model and/or from the satisfaction modeling and/or scoring produced by the prediction model.

Conversation control system 100 may determine (at 516) if the generated prediction model is the final prediction model. The final prediction model corresponds to the prediction model that is trained based on a particular feature set and that predicts client satisfaction with greater accuracy than other prediction models that are trained using different feature sets (e.g., the original feature set and/or different reduced feature sets). To determine (at 516) the final prediction model, process 500 includes performing multiple iterations of the training (at 508), score generation (at 510), correlation determination (at 512), and/or reducing (at 514) with different feature sets, comparing the predictions produced by the prediction model after each iteration, and selecting and/or retaining the prediction model with the greatest prediction or score accuracy. Process 500 uses (at 518) the final prediction model to predict one or more modeled aspects of client satisfaction from vectors of unlabeled conversations.

In some embodiments, once the best feature set is found, the final model is solved against the combined training and test data sets (e.g., to maximize the amount of data available for solving) using the selected features. In some embodiments, the final or optimal prediction model may be further adjusted, using a simple linear transform, to eliminate prediction bias. For instance, the final or optimal prediction model may be transformed linearly, by threshold, or as a 1 in N forced choice, based on the associated values. If, for example, the training data set had a skewed distribution, the model results would tend to be skewed as well. To correct for bias and skew in the model, one or more linear transforms are applied, such that accuracy relative to all possible classifications or score ranges are approximately equal. In the case of a "satisfied" or "dissatisfied" decision, for example, the model is transformed so that accuracy is roughly the same for both classifications. Likewise, if the score is a 1 to 5 Likert scale, the model is transformed in 4 segments representing different ranges of the model output, so that accuracies for all of the 5 classifications are equal.

In some embodiments, the generated prediction or score for the interaction or experience is the sum of the individual utterance scores (e.g., scores assigned to the vector generated for each utterance) and is the same as the score produced for the complete interaction or conversation. In other words, conversation control system 100 takes the full context of the utterance into account when calculating the score. Both the intermediate scores assigned to utterances within an interaction or conversation and the score for the interaction or conversation as a whole are stored in a database to be used for search and filtering. Additionally, these scores may be used as inputs to other models and as the basis for custom tuning.

Creating a custom tuned model based on the one or more scores output by the prediction model may include combining new data with the original labeled data (e.g., labeled conversations) that was used for training or by using the output of the prediction model as input to a new model. Conversation control system 100 may train the new model based on the combination of outputted scores, transcript text, category classifications, conversation metrics, and/or other real-valued variables to solve for a new set of outcomes. In this case, the prediction model is included as a component of the new model. Alternatively, the new model may be trained on the difference between the prediction model output and a new set of target outcome values. The new model is then trained using the transcript text and any other variables of interest to solve for the difference in outcome values. In this case, the output of the new model is simply added to the output of the prediction model to produce the target value. In this way, conversation control system 100 may generate multi-layered models and may combine the multi-layered models to meet different requirements. Generating the multi-layered models allows conversation control system 100 to preserve the base prediction model and/or allows the predictions of the base prediction model to be revised and improved independent from the tuned models that use them. By doing this, users of the custom models are able to get the benefit of improvements to the base prediction model without having to provide new training data or retune custom scores.

Figure 6:
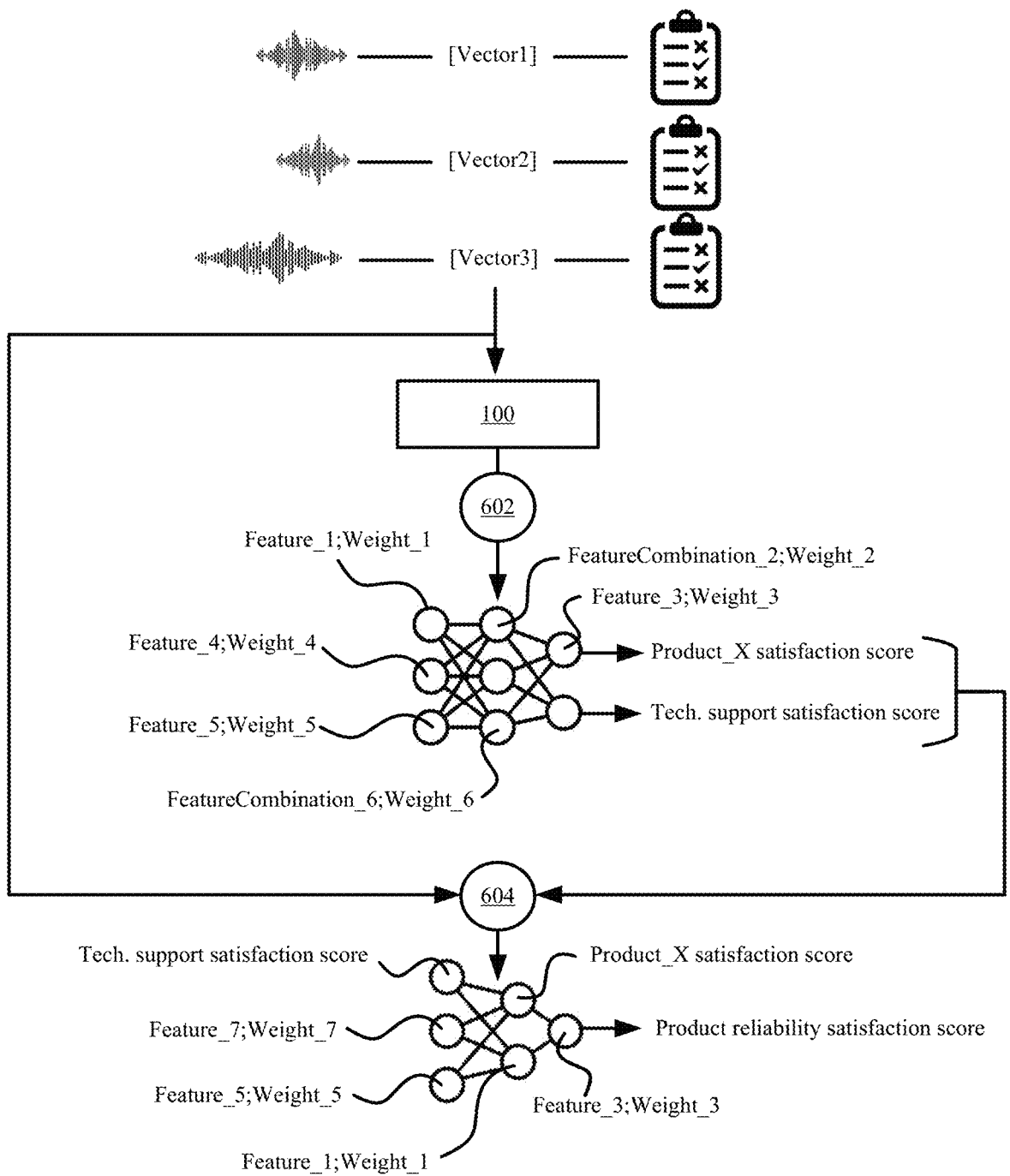
FIG. 6 illustrates an example of generating new outcomes from multi-layered models in accordance with some embodiments presented herein.

FIG. 6 illustrates an example of generating new outcomes from the multi-layered models in accordance with some embodiments presented herein. Conversation control system 100 trains (at 602) a base prediction model based on vectors and survey results from a labeled set of conversations. The base prediction model produces scores for a first set of client satisfaction factors or survey prompts.

Conversation control system 100 trains (at 604) a customized prediction model based on the scores produced by the base prediction model for the vectors from the labeled set of conversations and features or feature combinations of the vectors in order to produce scores for a second set of client satisfaction factors or survey prompts. The customized prediction model is defined independent of the base prediction model and relies on the scores produced by the base prediction model in order to determine client satisfaction across different aspects than the aspects represented by the scores produced by the base prediction model. For instance, the base prediction model generates scores for client satisfaction as relating to certain products and technical support provided for those certain products. The customized prediction model uses the scores as well as the features or feature combinations from the training dataset to determine client satisfaction as relating to the product reliability, brand satisfaction, and/or clients becoming repeat customers.

Conversation control system 100 may then receive or generate a vector from one or more utterances of an unlabeled conversation. Conversation control system 100 enters the vector as inputs for the base prediction model, and the base prediction model outputs the scores for the first set of client satisfaction factors or survey prompts. Conversation control system 100 enters the vector and the scores for the first set of client satisfaction factors or survey prompts as inputs for the customized prediction model, and the customized prediction model outputs the scores for the second set of client satisfaction factors or survey prompts without changing or modifying the base prediction model.

Conversation controller 107 of conversation control system 100 uses the generated predictions or scores to perform various automated actions. The automated actions include generating new content for directing or controlling the conversations, improving client satisfaction, and/or facilitating the automated monitoring of the conversations.

In some embodiments, the scores produced by conversation control system 100 and/or the generated models are archived and searchable. Accordingly, the scores from related conversations or interactions (e.g., conversations involves the same products, agents, teams, etc.) may be used to produce reports and to track changes in customer satisfaction. In some such embodiments, conversation controller 107 may dynamically generate a graphical user interface with tables, graphs and various aggregations of the scores in combination with other factors and classifications. For instance, conversation controller 107 may aggregate the predicted scores by company or industry and by high and low satisfaction, and may produce benchmarks to compare companies within and between industries. Accordingly, companies may compare their scores with those of other companies to see how well they perform against their competitors.

Conversation controller 107 may analyze the scores to perform post-hoc analyses that identify related factors such as agent ID, product line, geographical region, and other categorical and real-valued data. These analyses include, but are not limited to, correlations, post-hoc regression models, and other statistical analyses. Conversation controller 107 may selectively dissect the relationships between customer satisfaction and a wide variety of other factors, many of which are unique to a given industry or company, and may generate custom content to present in the graphical user interface or may perform automated actions related to controlling a conversation. The custom content may include isolating certain products, services, agents, teams, and/or category classifications that are associated with negative client satisfaction, and presenting the isolated data in the graphical user interface.

Figure 7:
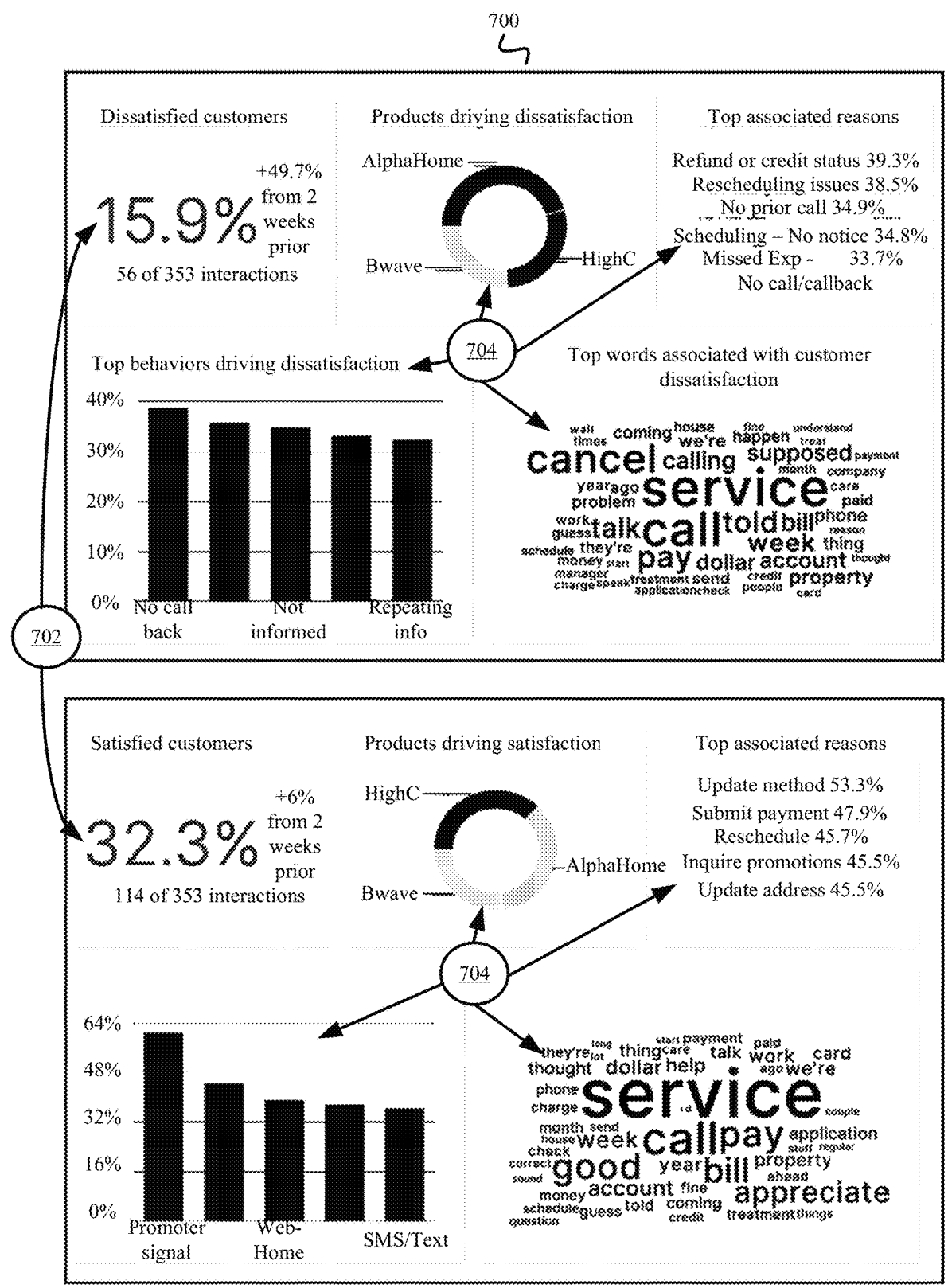
FIG. 7 illustrates an example of a dynamically generated interface that is populated with custom content based on the modeled predictions in accordance with some embodiments presented herein.

FIG. 7 illustrates an example of dynamically generated interface 700 that conversation controller 107 populates with custom content based on the modeled predictions in accordance with some embodiments presented herein. Specifically, interface 700 includes custom insights that conversation controller 107 generates based on the aggregated predictions from unlabeled conversations monitored by conversation control system 100.

Conversation controller 107 may determine and present (at 702) numbers or percentages of satisfied and dissatisfied customers based on the aggregated predictions that are generated from the modeling of the conversation vectors. In other words, the numbers or percentages are not based on scores that the customers manually provide by completing surveys. Instead, the numbers or percentages are dynamically generated data that conversation control system 100 generates from monitoring the conversations, generating the vectors for the utterances isolated from the conversations, and the simulated satisfaction scores that are generated by the prediction model.

Additionally, conversation controller 107 isolates and presents (at 704) the category classifications that are the primary cause for the different satisfaction scores based on the association of the category classifications to the vector features that produced the scores. For instance, the model may negatively affect a satisfaction score in response to detecting a feature combination within a vector that contains one or more words. The feature combination may also contain a particular category classification that is presented (at 704) in interface 700 in order to identify the categories responsible for the negative satisfaction. Alternatively, the model may negatively affect a satisfaction score in response to detecting a feature or feature combination within a vector that contains one or more words, conversation metrics, or other data. Conversation controller 107 may determine that the feature or feature combination was generated from a particular utterance of the conversation and that the particular utterance was classified with a particular label or identifier. Accordingly, conversation controller 107 may present (at 704) the particular label or identifier as a contributing factor to the negative satisfaction.

In any case, the content in interface 700 is dynamically generated by conversation controller 107 rather than by humans completing surveys. The dynamically generated content is derived from the predictions produced by the models and the different classifications and/or other data created for the utterances and/or vectors by conversation monitor 101 and/or classifiers 103.

In some embodiments, conversation controller 107 uses the predictions to perform automated actions that include filtering conversations so that only relevant utterances or segments of conversations satisfying scoring or satisfaction thresholds are presented to a user for review. In some such embodiments, the collective automated actions performed by conversation control system 100 include monitoring all conversations involving agents of a team or company, predicting customer satisfaction for each of the conversations, selecting a subset of conversations with predicted customer satisfaction that meet various monitoring thresholds, filtering the subset of conversations to isolate the utterances that primarily contributed to the predicted customer satisfaction, and dynamically generating a user interface that presents the isolated utterances from the filtered subset of conversations without humans having to listen to each conversation in order to identify the subset of conversations and isolate the utterances that contributed to predicted customer satisfaction.

Figure 8:
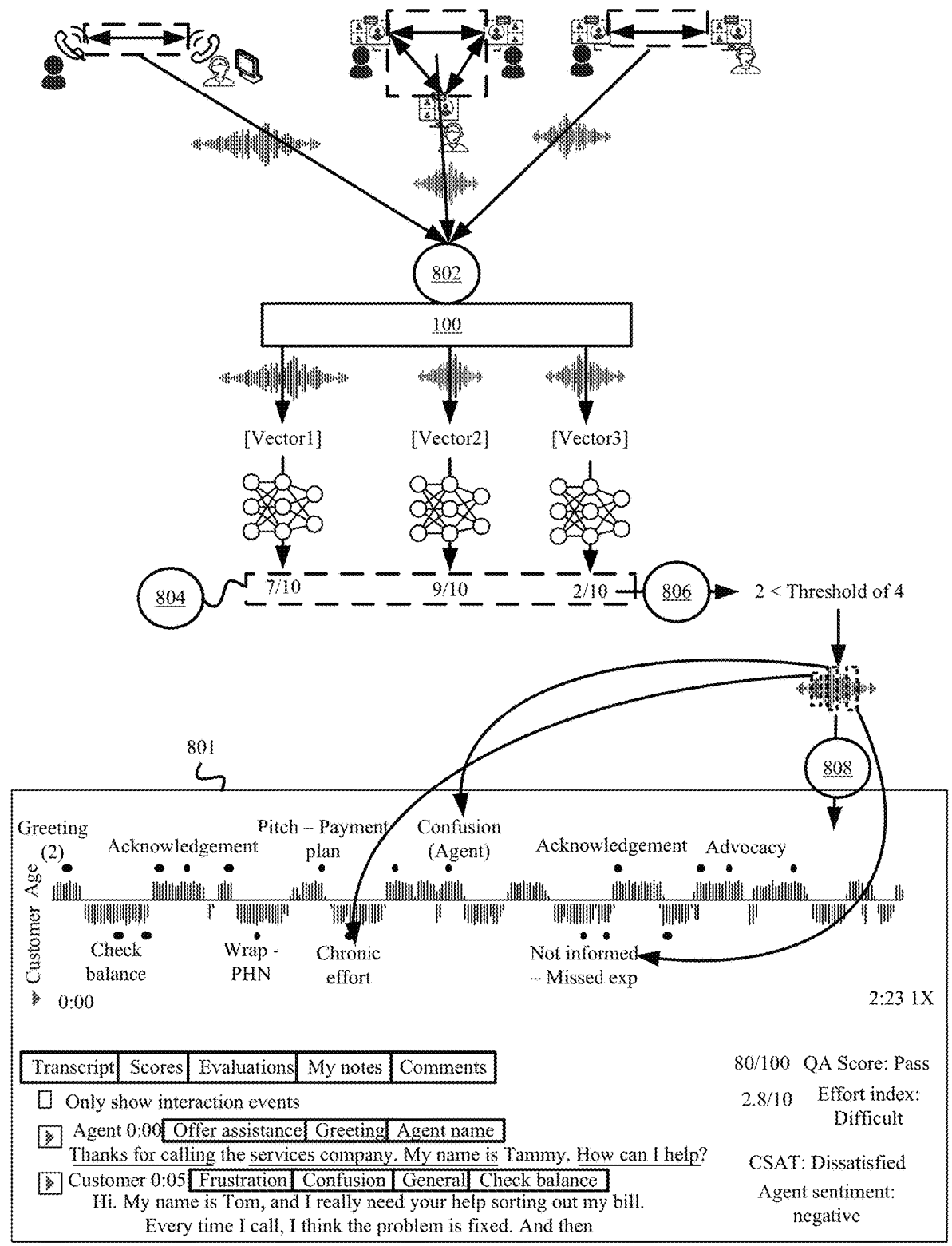
FIG. 8 illustrates an example of the automated conversation filtering performed in accordance with some embodiments presented herein.

FIG. 8 illustrates an example of the automated conversation filtering performed by conversation control system 100 in accordance with some embodiments presented herein.

Conversation control system 100 monitors (at 802) several different conversations taking place in an organization.

Conversation control system 100 predicts (at 804) customer satisfaction based on scores that the trained prediction model generates from features or feature combinations in the vectors created for each monitored conversation. Conversation control system 100 selects (at 806) one or more of the conversations with scores or predictions that are below various satisfaction thresholds.

Conversation control system 100 filters the one or more conversations to select the utterances that included the features leading to the negative scores or predictions. Conversation control system 100, by operation of conversation controller 107, generates (at 808) interface 801 to present the selected utterances from the one or more conversations that failed to meet the satisfaction thresholds. Interface 801 may be presented to a manager or supervisor while the one or more conversations are ongoing so that the manager or supervisor may intervene to assist the agents in those conversations or to more closely monitor the agents' activities. Specifically, by performing the post-hoc analysis, conversation controller 107 may dynamically identify specific aspects of a conversation, agent behavior, or business that need to be addressed to improve their customer satisfaction ranking.

In some embodiments, conversation controller 107 performs automated actions that involve controlling conversations. Controlling a conversation may include generating a script for an agent to follow, dynamically providing content for an active or ongoing conversation based on the monitoring and satisfaction modeling of previous utterances in that conversation, and/or generating a chatbot that directly engages and interacts with customers by providing and responding with utterances that are determined to lead to an optimal satisfaction outcome.

In some such embodiments, conversation controller 107 may use the predictions or scores produced by the prediction model and the features or feature combinations contributing to the predictions or scores as exploratory tools for identifying what specific actions produce the highest possible satisfaction scores. For instance, conversation controller 107 may identify key inflection points within an interaction or conversation (e.g., a customer asks a particular question, a customer asks about a particular product or service, a customer has a particular reaction or expresses a particular emotion, etc.). By then substituting different agent responses or dynamically generating responses from conversation controller 107 to the prediction model at those key inflection points and evaluating outputs of the prediction model in response to those responses, conversation controller 107 may discover a unique pattern of responses that produce the highest possible satisfaction score. Possible substitutions may be limited to valid options available to the agent and a range of possible substitutions appropriate for an interaction. The range of possible substitutions is explored to find the best result or response. The optimal sequence of customer and agent responses may then be used for training purposes when coaching agents, as real-time recommendations for agents, or to dynamically define machine-generated interactions between a chatbot and a human customer. As the range of acceptable responses can be explored at any point in an interaction, it is possible to find the response most likely to lead to high customer satisfaction during the interaction itself. In this context, the optimal agent response is selected not only for its independent effects on customer satisfaction, but for its combined effect when all of the interaction, up to that point, is taken into account. By comparing the current interaction with similar completed interactions in the archives, future parts of the conversation may be anticipated and taken into account when optimizing agent responses.

Figure 9:
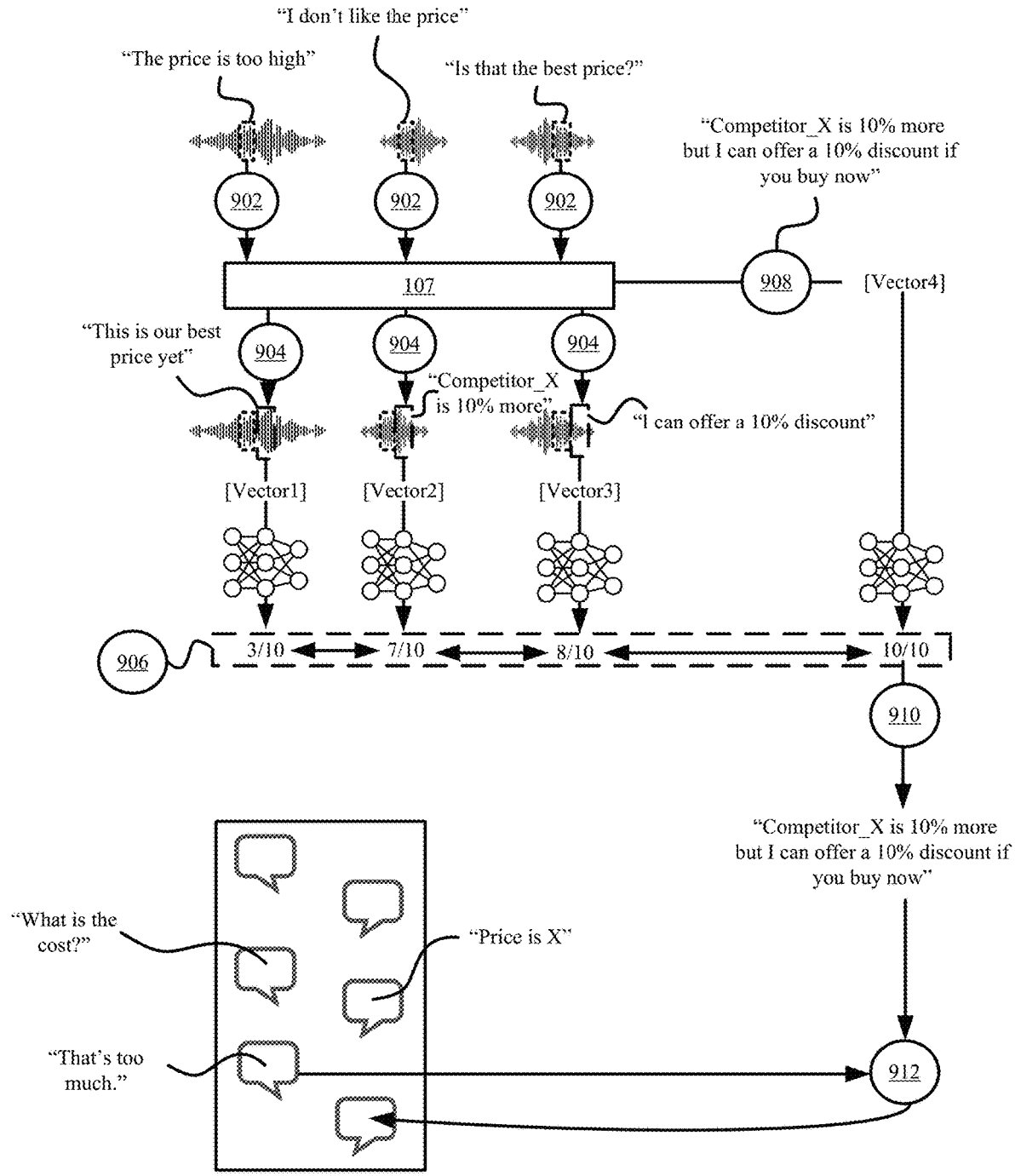
FIG. 9 illustrates an example of the conversation controller controlling a conversation based on the generated predictions in accordance with some embodiments presented herein.

FIG. 9 illustrates an example of conversation controller 107 controlling a conversation based on the generated predictions in accordance with some embodiments presented herein. Conversation controller 107 detects (at 902) the same inflection point in three completed conversations, determines (at 904) different responses provided by the agents at that inflection point, and compares (at 906) the satisfaction scores produced by the prediction model for the utterance or vector associated with each agent's response and/or the utterances or vectors that followed or preceded the response.

Conversation controller 107 may also generate (at 908) its own responses for the inflection point and feed the machine-generated responses and/or utterances and vectors preceding the inflection point into the prediction model to determine if the machine-generated response produce better satisfaction scores than the agent responses. Conversation controller 107 selects (at 910) the response (e.g., agent-generated or machine-generated) that when entered into the prediction model with all preceding or subsequent utterances or vectors results in the highest satisfaction score.

Conversation controller 107 may then operate as a chatbot or may provide real-time support to agents. Specifically, conversation controller 107 provides (at 912) the response that produces the highest satisfaction score in a subsequent conversation that reaches the same inflection point. When operating as a chatbot, conversation controller 107 generates the audio or enters the text for the optimal response in order to present the optimal response directly to the other conversation participant. When providing real-time support to an agent, conversation controller 107 dynamically adjusts the script that is followed by the agent or presents the optimal response for the inflection point on a display of a device used by that agent.

Other automated actions performed by conversation controller 107 include rating and training agents. By comparing the satisfaction predictions or scores produced in conversations involving a particular agent with the best and worst exploratory results (e.g., predictions or scores generated from conversations involving other agents or machine-generated conversations), the particular agent's performance may be rated in an unbiased manner.

In some cases, customer satisfaction can be outside of the particular agent's control. The particular agent may do everything possible to satisfy the customer and the prediction model may generate a negative satisfaction score because of utterances by that customer. Similarly, the particular agent may do everything wrong, and the prediction model may generate a positive satisfaction score because of utterances by that customer. As a result, customer satisfaction ratings alone are not always an accurate measure of the particular agent's performance. By identifying the best and worst case satisfaction scores for all of the particular agent's interactions and comparing them with the particular agent's actual satisfaction scores, the particular agent may be rated based on where they fall within that range. If the particular agent did everything right, they would tend to match the best possible exploration score and if they did everything wrong, they would tend to match the worst possible exploration score. This analytical process and the resulting agent rating separates agent performance from factors outside their control and thus provides a reliable measure of agent performance.

Figure 10:
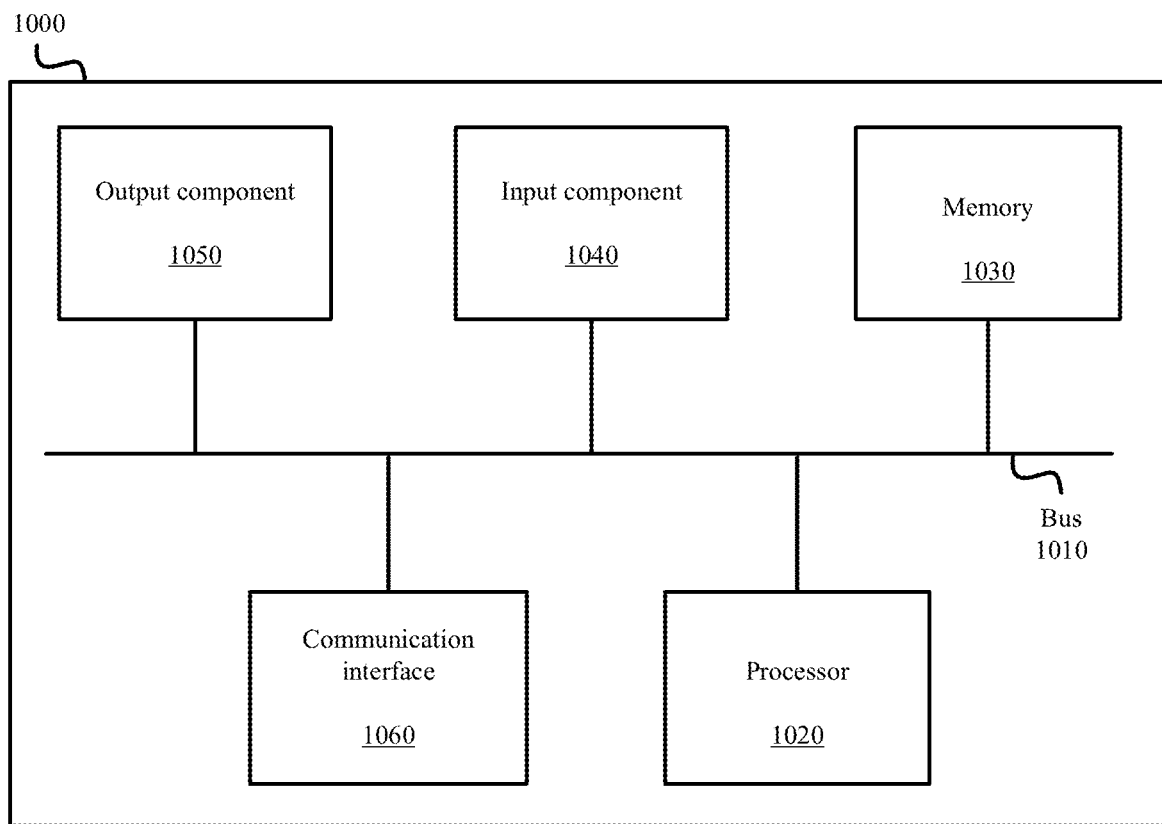
FIG. 10 illustrates example components of one or more devices, according to one or more embodiments described herein.

FIG. 10 is a diagram of example components of device 1000. Device 1000 may be used to implement one or more of the tools, devices, or systems described above (e.g., conversation control system 100, conversation monitor 101, classifiers 103, neural network 105, conversation controller 107, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   training, by execution of a neural network, a first prediction model based on a plurality of completed conversations and scores for a first set of conversation factors that are manually provided by users that participated in the plurality of completed conversations, wherein training the first prediction model comprises generating different sets of synapses based on detected correlations between feature combinations in the plurality of completed conversations that repeat and scores that repeat for those feature combinations, wherein each feature combination of the repeated feature combinations, that is represented by a different set of synapses of the different sets of synapses, is correlated with a score for one or more of the first set of conversation factors based on values provided for that feature combination;
   training, by execution of the neural network, a second prediction model that predicts scores for a second set of conversation factors that are not manually provided by the users and that differ from the first set of conversation factors, wherein training the second prediction model comprises using scores that the repeated feature combinations from the first prediction model generate for the first set of conversation factors and the values provided for the repeated feature combinations;
   integrating a conversation control system into a communications platform that routes a plurality of active conversations to devices of different conversation participants;
   monitoring, at the conversation control system, audio streams associated with the plurality of active conversations that are routed to the devices of the different conversation participants in response to integrating the conversation control system into the communications platform;
   segmenting, by execution of the conversation control system, a plurality of utterances by two or more participants from an audio stream associated with a particular active conversation of the plurality of active conversations;
   generating, by execution of the conversation control system, a vector with a plurality of features comprising two or more words, word sequences, conversation metrics, and category classifications associated with at least one of the plurality of utterances;
   providing, by execution of the conversation control system, the plurality of features as inputs to the first prediction model;
   generating, by execution of the conversation control system and the first prediction model, a first score for at least a first conversation factor of the first set of conversation factors based on the plurality of features matching a particular feature combination from the first prediction model and the first prediction model outputting the first score for that particular feature combination based on different weights that are associated with features of the particular feature combination in the first prediction model and that are assigned to the plurality of features;
   generating, by execution of the conversation control system and the second prediction model, a second score for at least a second conversation factor of the second set of conversation factors based on the training of the second prediction model associating a scoring of the second conversation factor to a scoring of the first conversation factor and the plurality of features; and
   performing an automated action comprising content that the conversation control system dynamically generates and presents to at least one device of the different conversation participants of the particular active conversation in response to the first score, the second score, and the plurality of utterances.

2. The method of claim 1 further comprising:
associating each utterance of the plurality of utterances by a particular participant of the two or more participants to that particular participant.

3. The method of claim 1 further comprising:
transcribing the audio stream associated with the particular active conversation; and
determining text that is generated from said transcribing that is associated with each different utterance of the plurality of utterances.

4. The method of claim 1 further comprising:
classifying each utterance of the plurality of utterances with one or more of the category classifications.

5. The method of claim 1 further comprising:
measuring a plurality of conversation metrics associated with the plurality of utterances; and wherein generating the vector comprises adding the plurality of conversation metrics to a set of the plurality of features.

6. The method of claim 1 further comprising:
receiving the audio stream of the particular active conversation that is generated over a first communication channel;
receiving textual messages exchanged as part of the particular active conversation over a second communication channel; and
generating the plurality of utterances from combining a transcription of the particular active conversation with the textual messages.

7. The method of claim 1, wherein performing the automated action comprises:
dynamically generating a response for a chatbot that represents one of the two or more participants; and
presenting the response during the particular active conversation via the chatbot.

8. The method of claim 1, wherein performing the automated action comprises:
detecting an inflection point at a particular point in the particular active conversation corresponding to a particular utterance of the plurality of utterances;
selecting a response to the particular utterance from a plurality of responses based on the first prediction model and the second prediction model outputting scores for the response and the inflection point that are greater than scores output by the first prediction model and the second prediction model for other responses of the plurality of responses and the inflection point; and
presenting the response on a device of an agent that participates in the particular active conversation.

9. The method of claim 1, wherein performing the automated action comprises:
generating a user interface comprising the category classifications that are associated with a set of features from the plurality of features that negatively impacted one or more of the first score or the second score.

10. The method of claim 1, wherein performing the automated action comprises:
detecting an inflection point at a particular point in the particular active conversation corresponding to a particular utterance of the plurality of utterances;
generating a plurality of responses to present at the inflection point;
ranking each response of the plurality of responses based on scores generated for each response by the first prediction model and the second prediction model;
selecting a particular response from the plurality of responses based on the ranking; and
presenting the particular response at the inflection point of the particular active conversation or a subsequent conversation.

11. The method of claim 1 further comprising:
completing a survey with the first set of conversation factors and the second set of conversation factors on behalf of at least one of the two or more participants using the first score and the second score and without input from any participant of the two or more participants.

12. The method of claim 1, wherein performing the automated action comprises:
controlling the particular active conversation by generating responses for a particular participant of the two or more participants.

13. The method of claim 1 further comprising:
generating a multi-linear polynomial equation based on the different weights assigned to the plurality of features.

14. The method of claim 13, wherein generating the first score comprises:
solving the multi-linear polynomial equation; and
generating scores for one or more aspects of customer satisfaction based on outputs created from solving the multi-linear polynomial equation.

15. A conversation control system comprising:
one or more hardware processors configured to:
train, by execution of a neural network, a first prediction model based on a plurality of completed conversations and scores for a first set of conversation factors that are manually provided by users that participated in the plurality of completed conversations, wherein training the first prediction model comprises generating different sets of synapses based on detected correlations between feature combinations in the plurality of completed conversations that repeat and scores that repeat for those feature combinations, wherein each feature combination of the repeated feature combinations, that is represented by a different set of synapses of the different sets of synapses, is correlated with a score for one or more of the first set of conversation factors based on values provided for that feature combination;
train, by execution of the neural network, a second prediction model that predicts scores for a second set of conversation factors that are not manually provided by the users and that differ from the first set of conversation factors, wherein training the second prediction model comprises using scores that the repeated feature combinations from the first prediction model generate for the first set of conversation factors and the values provided for the repeated feature combinations;
monitor audio streams associated with the plurality of active conversations that are routed to devices of different conversation participants;
segment a plurality of utterances by two or more participants from an audio stream associated with a particular active conversation of the plurality of active conversations;
generate a vector with a plurality of features comprising two or more words, word sequences, conversation metrics, and category classifications associated with at least one of the plurality of utterances;
provide the plurality of features as inputs to the first prediction model;
generate, using the first prediction model, a first score for at least a first conversation factor of the first set of conversation factors based on the plurality of features matching a particular feature combination from the first prediction model and the first prediction model outputting the first score for that particular feature combination based on different weights that are associated with features of the particular feature combination in the first prediction model and that are assigned to the plurality of features;
generate, using the second prediction model, a second score for at least a second conversation factor of the second set of conversation factors based on the training of the second prediction model associating a scoring of the second conversation factor to a scoring of the first conversation factor and the plurality of features; and perform an automated action comprising content that the conversation control system dynamically generates and presents to at least one device of the different conversation participants of the particular active conversation in response to the first score, the second score, and the plurality of utterances.

16. The conversation control system of claim 15, wherein the one or more hardware processors are further configured to:

transcribe the audio stream associated with the particular active conversation; and determine text that is generated from said transcribing that is associated with each different utterance of the plurality of utterances.

17. The conversation control system of claim 15, wherein the one or more hardware processors are further configured to:

receive the audio stream of the particular active conversation that is generated over a first communication channel;

receive textual messages exchanged as part of the particular active conversation over a second communication channel; and generate the plurality of utterances from combining a transcription of the particular active conversation with the textual messages.

18. The conversation control system of claim 15 further comprising:

a chatbot that operates as one of the two or more participants; and wherein performing the automated action comprises:
dynamically generating a response for the chatbot; and
presenting the response during the particular active conversation via the chatbot.

19. The conversation control system of claim 15, wherein performing the automated action comprises:

detecting an inflection point at a particular point in the particular active conversation corresponding to a particular utterance of the plurality of utterances;

selecting a response to the particular utterance from a plurality of responses based on the first prediction model and the second prediction model outputting scores for the response and the inflection point that are greater than scores output by the first prediction model and the second prediction model for other responses of the plurality of responses and the inflection point; and presenting the response on a device of an agent that participates in the particular active conversation.

20. A non-transitory computer-readable medium storing instructions that, when executed by one or more processors of a conversation control system, cause the conversation control system to perform operations comprising:

training, by execution of a neural network, a first prediction model based on a plurality of completed conversations and scores for a first set of conversation factors that are manually provided by users that participated in the plurality of completed conversations, wherein training the first prediction model comprises generating different sets of synapses based on detected correlations between feature combinations in the plurality of completed conversations that repeat and scores that repeat for those feature combinations, wherein each feature combination of the repeated feature combinations, that is represented by a different set of synapses of the different sets of synapses, is correlated with a score for one or more of the first set of conversation factors based on values provided for that feature combination;

training, by execution of the neural network, a second prediction model that predicts scores for a second set of conversation factors that are not manually provided by the users and that differ from the first set of conversation factors, wherein training the second prediction model comprises using scores that the repeated feature combinations from the first prediction model generate for the first set of conversation factors and the values provided for the repeated feature combinations;

integrating the conversation control system into a communications platform that routes a plurality of active conversations to devices of different conversation participants;

segmenting a plurality of utterances by two or more participants from an audio stream associated with a particular active conversation of the plurality of active conversations;

generating a vector with a plurality of features comprising two or more words, word sequences, conversation metrics, and category classifications associated with at least one of the plurality of utterances;

providing the plurality of features as inputs to the first prediction model;

generating, using the first prediction model, a first score for at least a first conversation factor of the first set of conversation factors based on the plurality of features matching a particular feature combination from the first prediction model and the first prediction model outputting the first score for that particular feature combination based on different weights that are associated with features of the particular feature combination in the first prediction model and that are assigned to the plurality of features;

generating, using the second prediction model, a second score for at least a second conversation factor of the second set of conversation factors based on the training of the second prediction model associating a scoring of the second conversation factor to a scoring of the first conversation factor and the plurality of features; and performing an automated action comprising content that the conversation control system dynamically generates and presents to at least one device of the different conversation participants of the particular active conversation in response to the first score, the second score, and the plurality of utterances.

* * * * *